Oct. 28, 1969   A. FLATAU   3,474,990
PARACHUTE WITH CANOPY VENT AND STANDOFF PANEL
Filed Aug. 17, 1967   2 Sheets-Sheet 1

PRIOR ART

INVENTOR.
Abraham Flatau
BY Harry M. Saragovitz
Edward J. Kelly, Herbert Berl
& Jacob Ziegler
ATTORNEYS Oct. 28, 1969   A. FLATAU   3,474,990
PARACHUTE WITH CANOPY VENT AND STANDOFF PANEL
Filed Aug. 17, 1967   2 Sheets-Sheet 2
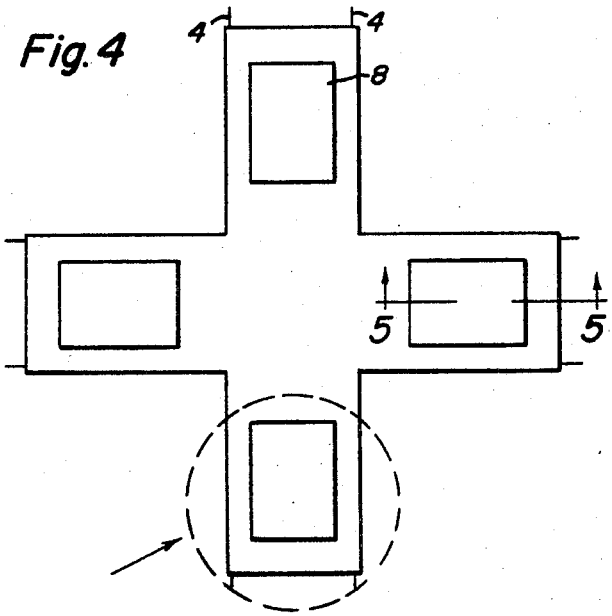
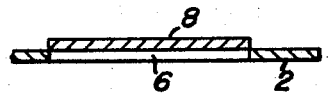
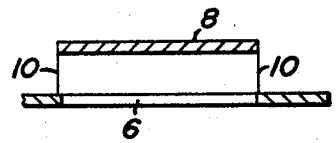
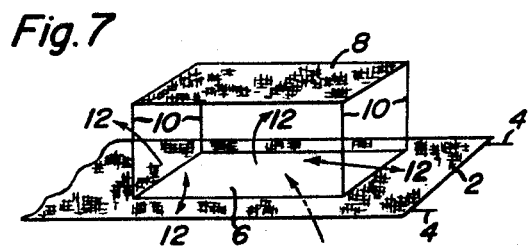
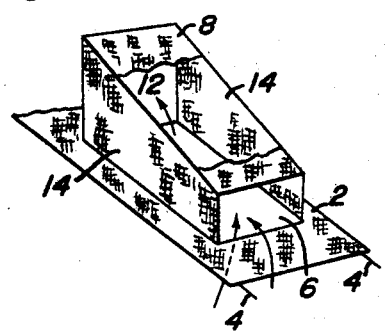
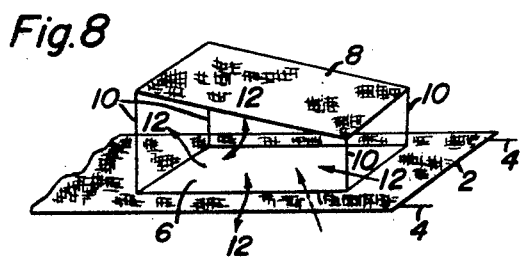
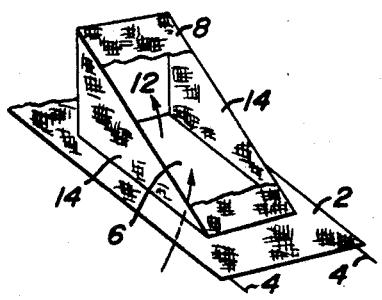
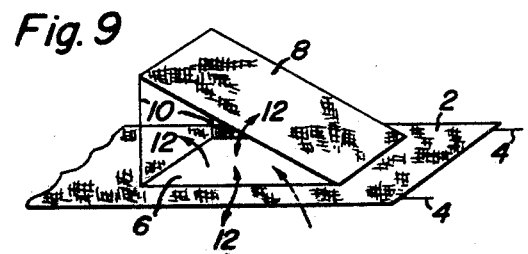
INVENTOR.
Abraham Flatau
BY Harry M. Saragovitz,
Edward J. Kelly, Herbert Berl
& Jacob Ziegler
ATTORNEYS 3,474,990
PARACHUTE WITH CANOPY VENT AND
STANDOFF PANEL
Abraham Flatau, P.O. Box 657, Edgewood, Md. 21040
Filed Aug. 17, 1967, Ser. No. 661,474
Int. Cl. B64d 17/18
U.S. Cl. 244—145                               12 Claims

ABSTRACT OF THE DISCLOSURE

A parachute comprising a canopy composed of a plurality of panels, each panel composed of a plurality of circumferential canopy apertures covered by a plurality of standoff panels corresponding in position to the said canopy apertures and exterior means connecting the said standoff panels to said each panel.

This canopy design provides for the control of the air flow direction and volume of air in the local canopy area.

DEDICATORY CLAUSE

The invention described herein may be manufactured, used, and licensed by or for the Government for governmental purposes without the payment to me of any royalty thereon.

SPECIFICATION

This invention relates to parachutes having vents for the purpose of maintaining a stable trajectory and sufficient drag during descent.

An object of the invention is to provide a parachute design which is non-rotational about its axis of descent.

A further object of my invention is to provide a novel parachute canopy design embodying means for permitting the escape of air from beneath and through an aperture in the canopy being covered by a standoff panel which provides for the control of the flow direction and volume of air in the local canopy area.

Another object of this invention is to increase the drag and stability of a parachute without increasing the total surface area of the canopy and its concomitant increase in weight.

In the U.S. Patent No. 2,764,375 to Lemoigne, FIGURE 1 illustrates the parachute canopy 2 and at 3 an annular band of openings communicating the inner space of the said canopy with another canopy element or nozzles 5 functioning to accelerate the flow of air escaping through opening 7. The canopy element 5 is opened automatically upon impact of air and then closes again automatically to reconstitute the normal outline of the canopy. It is to be noted that the flap 5 is a continuation of the canopy forming a slight bulge when the air forces the flap open. There are no open sides when the flap is in extended position.

In the U.S. Patent No. 1,872,705 to Elliott, FIGURE 2 illustrates the parachute design incorporating a cape 11 which is secured to the canopy 2 by means of flaps or stays 13 and cords 15 being midway between the stays. The configuration permits air to fill the cape and subsequently the entrapped air escapes through the conventional opening 17 at the top of the cape.

The dominant feature of all parachutes is to decelerate the body so that the contact with land causes little damage. In order to accomplish this effect, the parachute in its descending course should deploy reliably, be stable, and provide the maximum amount of drag for its particular geometry. Each of these desired characteristics describes a quality which is far from optimal in the conventional parachute. An example of the latter design is the "flat-circular" parachute which is the configuration used for dropping troops and supplies.

The paramount problem of designing a parachute is to minimize the characteristic of instability. As the parachute descends, the oncoming air must alter its direct flow direction to adjust to the parachute canopy. This creates a low pressure area behind the canopy and the diverted air tends to collapse and reform into this area behind the canopy creating flow or wake. Turbulence usually offers the highest amount of drag or resistive force, which is not surprising in view that turbulence serves as a counterpart of the consumption of energy.

This turbulent flow around the aft portion of the canopy and in the wake of the canopy is an aperiodic or asymmetrical condition. In turn this results in a non-uniform force application on the canopy and a periodic rocking movement or oscillation develops; the parachute is now oscillating and transfers this motion to the attached load. This causes a change in its stability and affects the trajectory during its descent.

It would be misleading to leave the reader with the over-simplification of the scientific explanation of oscillation phenomenon since this phenomenon is governed by a complex set of factors, including canopy design, descent velocity and flow field interactions. Oscillations can build up to large amplitudes and effect the descent trajectory and controllability of the parachute and its attached load.

To minimize this oscillation, a general method to date has been to provide a vent hole in the apex of the canopy which induces a direct flow of air into the wake area behind the canopy, thereby reducing the turbulence with a corresponding decrease in oscillation. The drawback in the utilization of the vent hole is that the drag effect of the parachute is less effective.

None of the conventional parachute designs, hemisphere, flat-circular, and two rectangular panels at right angles to each other, have the desired optimal stability during descent. The present available parachutes are unable to prevent the load from oscillating, although this oscillation can be somewhat minimized when the load is trained personnel, but oscillation cannot be compensated when the load is inanimate like a vehicle or military equipment.

An investigation was instituted to determine what design would result in maximum stability and drag and at the same time keep the parachute configuration simple for fabrication means.

My investigation was based on a canopy design formed by two rectangular strips at right angles to each other. This rectangular design was of great interest to me in view that this parachute has less cloth area and weight as compared with the standard full hemisphere parachute on the basis of equal diameter.

The result of my investigation disclosed the utilization of a standoff panel over an aperture circumferentially positioned in the canopy gave rise to greater stability with an increase in drag than is present in the commercially available parachutes of this type. Here for the first time there is a design that does not surrender the drag effect in order to have greater stability.

This standoff panel and aperture combination is applicable to other commercially available, non-rotating, parachutes. However, the major aerodynamic feature which is less than desirable in the design based on the two rectangular strips normal to each other is the small proportion of drag in relation to the diameter of the canopy. This small amount of drag effect is readily understandable since this effect is usually related to the total surface area of the canopy which, by visual inspection, is less than the full hemisphere canopy. I have found that with the utilization of the standoff panel with this canopy-aperture design, the aerodynamic features of drag and stability are now greatly improved and substantially similar to the drag and stability of a canopy requiring a greater total surface area.

The standoff panel concept represents a major breakthrough in canopy design which is applicable to all canopy configurations by permitting greater drag and stability without increasing the total surface area of the canopy with its concomitant increase in weight.

FIGURE 3 is a particular basic parachute configuration which is a canopy 2 formed by two rectangular strips at right angle to each other and having suspension lines 4 attached along the marginal edges of each arm of the said canopy.

In the forms of my invention illustrated in FIGURES 4–11, the parachute embodies a canopy planform 2 formed by two rectangular strips at right angles or normal to each other with a plurality of canopy apertures 6 and corresponding plurality of standoff panels 8 and shroud lines 4 running along the outside edge of rectangular strip or panel uniting at a focal point. The scope of this invention is intended to include two or more canopy apertures and their corresponding standoff panels in each arm of the canopy. However, the preferred embodiment is a single canopy aperture with its single standoff panel for each canopy arm or gore.

The dimensions of the canopy aperture and the standoff panel may be varied. The preferred results have been obtained where there are four cut-out sections or canopy apertures equally positioned circumferentially in the canopy. The standoff panel is always equal to the same dimensions as the cut-out vent, or it may be larger. The center line of the cut-out vent is preferably spaced on a vertical line equidistant between the border edges of each rectangular panel or gore. It is obvious that the panel length may vary. For example, the length of each rectangular panel may vary from 18 to 36 inches. The associated relative dimensions of the standoff panel and canopy apertures are then from about 3 to 7 inches in length on the side parallel with the long edge of the rectangular arm and from about 2.5 to 5.5 inches in width and positioned from 1 to 3 inches in the section parallel and adjacent to the skirt.

The alternative configuration embodies the concept of an overlap of the standoff panel in relationship to the cut-out section in the canopy. The overlap comprises increasing the lateral dimension and a concomitant increase in the longitudinal dimension downstream of the standoff cover. The effect of this modification is to provide additional flow control by varying the air channeling means. In this manner, the flow through the channeling means will be less subject to immediate tripping or separation which would reduce or lessen the flow control.

These and other objects and features of my invention will appear from the following description thereof in which reference is made to the figures of the accompanying drawings.

In the drawings:

FIGURE 4 is similar to view of FIGURE 3 with the added feaure of showing standoff panel superimposed on the canopy aperture.

FIGURE 5 is a perspective view partly in section of FIGURE 4 along line 5—5 showing the standoff panel in its unextended position.

FIGURE 6 is a perspective of the view of FIGURE 5 illustrating the standoff canopy as seen during normal descent of the parachute.

FIGURE 7 is a diagrammatic side elevation of FIGURE 6.

FIGURES 8–9 are diagrammatic side elevations of alternative forms of the standoff panel embodying my invention.

FIGURES 10–11 are diagrammatic side elevations of further alternative embodiments of my invention showing a fragment of the standoff panel.

When the parachute is in flight, the force of the air below the parachute, or whatever air pressure the parachute encounters during initial opening and its descent, causes the standoff panel over the aperture in the canopy to automatically open and remain extended under the same conditions as does the canopy. A portion of the air pressure thus confined beneath the parachute escapes through the canopy aperture 6 and exiting to the atmosphere through the opening or gap 12 between the canopy planform 2 and the under side of the standoff panel 8. The configuration of the canopy aperture and standoff panel in conjunction with the flexible tie-lines 10 are designed to control the flow of air that passes out through the parachute to the atmosphere for influencing the dropping speed and at the same time improving the stability during its descent.

Figure 1:
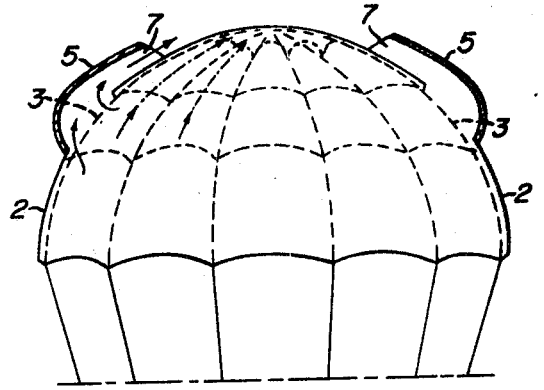
FIGURE 1 is the prior art design of Lemoigne, U.S. Patent No. 2,764,375.
Figure 2:
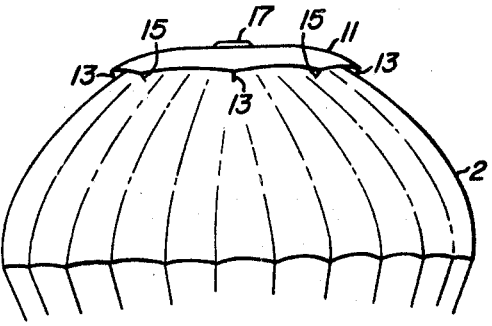
FIGURE 2 is the prior art design of Elliott, U.S. Patent No. 1,872,705.
Figure 3:
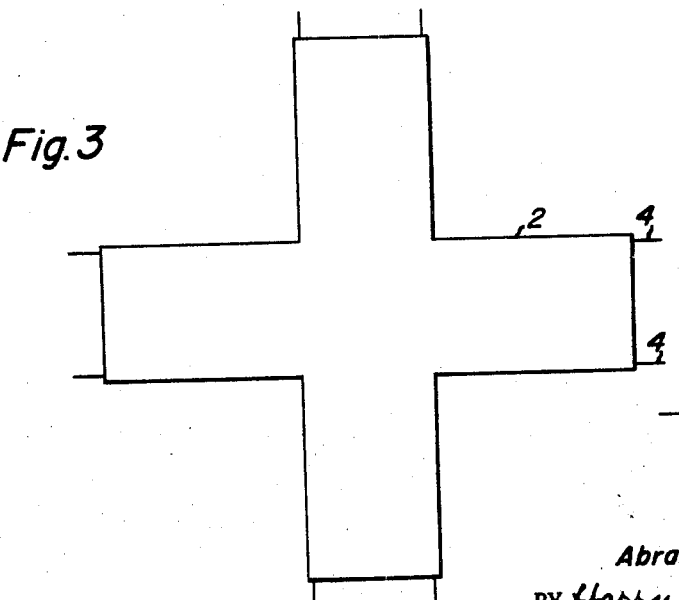
FIGURE 3 is a plan view of a prior art parachute formed by two rectangular strips at right angles to each other.

FIGURE 4 is similar to FIGURE 3 with the added feature of illustrating the standoff panel 8 superimposed on the canopy aperture 6.

FIGURE 5 illustrates the standoff panel 8 in its unextended position that is prior to deployment and completely covering and abutting the canopy aperture 6. FIGURE 6, similar in view to FIGURE 5, describes the standoff panel 8 in its fully extended position after parachute deployment with flexible tie lines 10 being attached between each corner of the standoff panel and the corner of the canopy aperture.

FIGURE 7, substantially similar to FIGURE 6, and showing the standoff panel 8 in a full extended position after deployment. The tie lines 10 attaching said panel to canopy 2 are of all equal length. The standoff panel 8 being cambered and parallel to the canopy 2 thereby tending to assume the aerodynamic configuration of the canopy as if it were one continuous surface exposed to the surrounding fluid medium.

FIGURE 8, similar to FIGURE 7, with the modification showing the canting of the standoff panel. Superimposed upon the canopy aperture 6 is the standoff panel with the tie lines 10 leaving a space 12 between the canopy planform and underside of standoff panel. The said panel may be canted to any desirable degree by adjusting the flexible tie lines 10 to contract the distance between canopy planform and standoff panel side which is adjacent to the skirt. The air flow has four avenues of movement as illustrated by the curved arrows 12.

FIGURE 9, similar to FIGURE 8, illustrates the complete canting of the standoff panel 8 such that the side of the panel which is adjacent to the skirt is now directly attached to the corresponding side of the canopy aperture 6. In this configuration there are three routes of air flow control as shown by the arrows 12.

FIGURE 10 illustrates the modification of FIGURE 8 wherein a canted standoff panel is utilized with the added feature that parachute fabric encloses the two sides which are adjacent to the longitudinal marginal sides of the canopy planform by directly attaching the said fabric between the standoff panel and canopy planform. In this configuration, only two air control flow means are available being the opening on the longitudinal downstream side and the aft portion being adjacent to the skirt as illustrated by the curved arrows 12.

FIGURE 11 illustrates the modification of FIGURE 9 wherein a fully canted standoff panel is utilized with the added feature of enclosing the sides being adjacent to the longitudinal marginal edges of the canopy panel are of parachute fabric as is the canopy panel. This configuration permits air flow control through the simple opening being on the longitudinal downstream side in view that the standoff panel edge adjacent to the skirt is directly attached to the full canopy.

Although for description purposes FIGURES 8–11 are examples of the principle of canting the standoff panel, this is not to be construed as the only two canting configurations. It is within the scope of this invention that the said panel be inclined by adjusting the two tie lines 10 being adjacent to the skirt in all length immediate below the parallel position of the said panel to the canopy planform to the direct attachment of the side of the said panel to the canopy planform.

In the construction of the parachute, the canopy fabric and the standoff panel may consist of the following materials: linen, silk, cotton, jute hessian, paper, cellulose acetate fabric, viscose rayon fabric, cuprammonium rayon fabric, nylon, and other synthetic fibers.

While I have shown and described my invention, it is to be understood that various changes in the shape, size and arrangement of parts may be resorted to without departing from the scope and spirit of the invention.

I claim:

1. A parachute comprising a canopy comprising a plurality of panels, each panel comprising at least one circumferential canopy aperture covered by a standoff panel, the sides of the standoff panel being substantially co-extensive with its canopy aperture in inflated position, each said aperture having parallel sides and each positioned inwardly from the skirt and bordered by the material of each panel along each side of said aperture, the lower side of said aperture being adjacent to the skirt area of said canopy, nonelastic exterior means fixedly securing the standoff panel to the edges of the canopy aperture, and the standoff panels automatically opening and remaining extended under the same conditions as the canopy during initial opening and full descent.

2. A parachute comprising a canopy of two rectangular strips at right angles to each other with shroud lines running along the longitudinal edges of each strip and combining at a focal point, each arm of said two rectangular strips comprising one circumferential canopy aperture covered by a standoff panel, the sides of the standoff panel being substantially co-extensive with its canopy aperture in an inflated position, each said aperture having parallel sides and each positioned inwardly from the skirt and bordered by the material of each panel along each side of said aperture, the lower side of said aperture being adjacent to the skirt area of said canopy, separate nonelastic exterior means fixedly securing the standoff panel to the edges of the canopy aperture, and the standoff panels automatically opening and remaining extended under the same conditions as the canopy during initial opening and full descent.

3. A parachute according to claim 2, wherein the said exterior means join each corner of the said canopy aperture to the corresponding corner of the said covering standoff panel.

4. A parachute according to claim 2, wherein the said standoff panel is parallel to the corresponding said canopy aperture.

5. A parachute according to claim 2, wherein the aerodynamic shape of the said standoff panel is a continuous aerodynamic configuration of the said canopy.

6. In the parachute according to claim 2, the border adjacent to the skirt of the canopy of the said canopy aperture forms an inclined plane with the border of the corresponding said covering standoff panel.

7. In the parachute according to claim 6, wherein the said border adjacent to the skirt of the canopy of the canopy aperture forming the inclined plane is contiguous with the said border of the corresponding covering standoff panel.

8. In the parachute according to claim 2, wherein the exterior means are contiguous canopy fabric joining the entire longitudinal edges of the said canopy aperture to the edges of the said corresponding covering standoff panel.

9. In the parachute according to claim 8, wherein the standoff panel is parallel to the said corresponding canopy aperture.

10. In the parachute according to claim 8, wherein the aerodynamic shape of the said standoff panel is a continuous aerodynamic configuration of the said canopy.

11. In the parachute according to claim 8, wherein the border adjacent to the skirt of the canopy of the said canopy aperture forms an inclined plane with the border of the said corresponding covering standoff panel.

12. In the parachute according to claim 11, wherein the said border adjacent to the skirt of the canopy of the canopy aperture forming the inclined plane is contiguous with the said border of the corresponding covering standoff panel.

References Cited

UNITED STATES PATENTS

| | | | |
|---|---|---|---|
| 2,393,634 | 1/1946 | Horak et al. | 244—152 |
| 2,472,601 | 6/1949 | Mallory | 244—145 |
| 3,104,856 | 9/1963 | Knacke et al. | 244—145 |
| 3,228,637 | 1/1966 | Gross | 244—152 |
| 3,331,573 | 7/1967 | Winker et al. | 244—145 |

FOREIGN PATENTS

| | | |
|---|---|---|
| 823,947 | 10/1937 | France. |
| 70,724 | 4/1942 | Czechoslovakia. |
| 1,092,383 | 11/1954 | France. |
| 1,184,001 | 2/1959 | France. |
| 253,070 | 7/1964 | Australia. |

MILTON BUCHLER, Primary Examiner

THOMAS W. BUCKMAN, Assistant Examiner

U.S. Cl. X.R.

244—152